US012628047B2

(12) United States Patent
Liu

(10) Patent No.: US 12,628,047 B2
(45) Date of Patent: May 12, 2026

(54) METHOD AND APPARATUS FOR ACQUIRING CONFIGURATION INFORMATION

(71) Applicant: Spreadtrum Communications (Shanghai) Co., Ltd., Shanghai (CN)

(72) Inventor: Xing Liu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 446 days.

(21) Appl. No.: 18/033,214

(22) PCT Filed: Oct. 12, 2021

(86) PCT No.: PCT/CN2021/123333
§ 371 (c)(1),
(2) Date: Apr. 21, 2023

(87) PCT Pub. No.: WO2022/083478
PCT Pub. Date: Apr. 28, 2022

(65) Prior Publication Data
US 2024/0031874 A1     Jan. 25, 2024

(30) Foreign Application Priority Data
Oct. 22, 2020     (CN) .......................... 202011139267.0

(51) Int. Cl.
*H04W 28/24*          (2009.01)
*H04W 24/02*          (2009.01)
(Continued)

(52) U.S. Cl.
CPC ........... *H04W 28/24* (2013.01); *H04W 24/02* (2013.01); *H04W 76/14* (2018.02); *H04W 88/04* (2013.01)

(58) Field of Classification Search
CPC ..... H04W 28/24; H04W 24/02; H04W 88/04; H04W 72/40; H04W 4/70; H04W 76/14
See application file for complete search history.

(56) References Cited

U.S. PATENT DOCUMENTS

| | | |
|---|---|---|
| 2017/0347338 A1 | 11/2017 | Chen et al. |
| 2018/0098370 A1 | 4/2018 | Bangolae et al. |

(Continued)

FOREIGN PATENT DOCUMENTS

| | | |
|---|---|---|
| CN | 102164385 A | 8/2011 |
| CN | 107483337 A | 12/2017 |

(Continued)

OTHER PUBLICATIONS

Xu et al., "Communication Method and Apparatus", Jan. 20, 2022, WO, WO 2022012361 (Year: 2022).*

(Continued)

*Primary Examiner* — Michael K Phillips
(74) *Attorney, Agent, or Firm* — Quarles & Brady LLP

(57)          ABSTRACT

Embodiments of the present application provide a method for acquiring configuration information. The method includes: acquiring, by a relay device, first service information and/or first quality of service information of a first link from a first device, where the first link is a link between the first device and the relay device; sending, by the relay device, the first service information and/or second quality of service information to a network device, where the second quality of service information is a subset of the first quality of service information; and acquiring, by the relay device, configuration information of a second link from the network device, where the second link is a link between the relay device and a second device.

13 Claims, 9 Drawing Sheets

A relay device acquires first service information and/or first quality of service information of a first link from a first device, where the first link is a link between the first device and the relay device — S41

The relay device sends the first service information and/or second quality of service information to a network device, where the second quality of service information is a subset of the first quality of service information — S42

The relay device acquires configuration information of a second link from the network device, where the second link is a link between the relay device and a second device — S43

(51) Int. Cl.
    *H04W 76/14*    (2018.01)
    *H04W 88/04*    (2009.01)

(56)           References Cited

U.S. PATENT DOCUMENTS

| | | | | |
|---|---|---|---|---|
| 2019/0320361 A1* | 10/2019 | Uchiyama | ........... | H04W 36/033 |
| 2020/0163005 A1 | 5/2020 | Rao et al. | | |
| 2020/0305139 A1 | 9/2020 | Xu et al. | | |
| 2022/0240122 A1* | 7/2022 | Liu | ......................... | H04W 4/50 |
| 2023/0046157 A1* | 2/2023 | Xu | .......................... | H04W 4/70 |
| 2023/0127924 A1* | 4/2023 | Srinivasan | ........ | H04W 28/0268 370/328 |
| 2023/0171645 A1* | 6/2023 | Wang | ................ | H04W 28/0268 455/11.1 |
| 2023/0232487 A1* | 7/2023 | Freda | ................... | H04W 76/23 455/11.1 |
| 2023/0292391 A1* | 9/2023 | Mochizuki | ........... | H04W 76/27 |

FOREIGN PATENT DOCUMENTS

| | | | |
|---|---|---|---|
| CN | 108668351 A | 10/2018 | |
| CN | 110602801 A | 12/2019 | |
| CN | 110830954 A | 2/2020 | |
| WO | 2020164741 A1 | 8/2020 | |
| WO | WO-2022012361 A1 * | 1/2022 | ............ H04W 28/24 |

OTHER PUBLICATIONS

"Written Opinion of the International Searching Authority", Jan. 13, 2022, CN, PCT/CN2021/123333 (Year: 2021).*

Extended European Search Report, European Patent Application No. 21881896.1, Mar. 26, 2024.

Intel Corporation: "Impact on user plane protocol stack and control plane procedure for Sidelink relay", R2-2007608, vol. RAN WG2, No. ••meeting; Aug. 17, 2020-Aug. 28, 2020 Aug. 7, 2020 (Aug. 7, 2020).

Intel Corporation: "Characteristics of L2 and L3-based Sidelink Relaying", R2-2006718, vol. Ran WG2, No. E-meeting; Aug. 17, 2020-Aug. 28, 2020 Aug. 7, 2020 (Aug. 7, 2020).

* cited by examiner

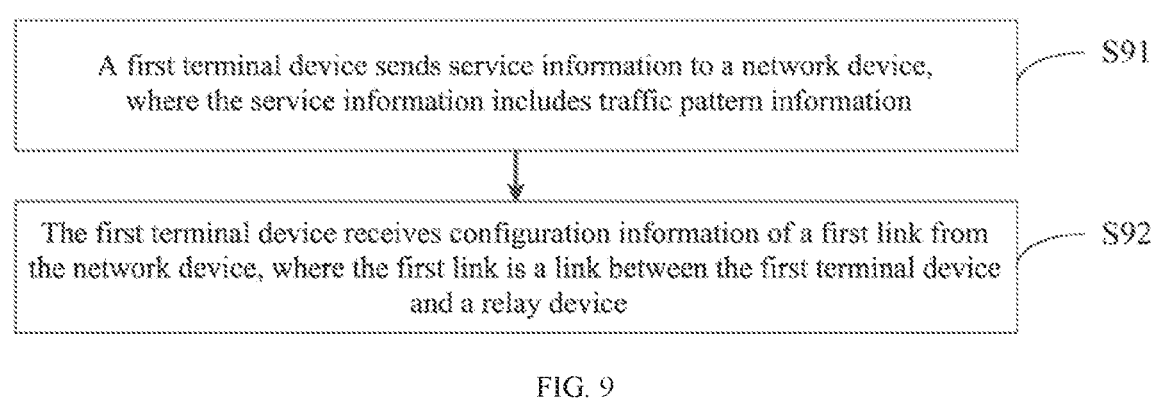

A first terminal device sends service information to a network device, where the service information includes traffic pattern information — S91

The first terminal device receives configuration information of a first link from the network device, where the first link is a link between the first terminal device and a relay device — S92

FIG. 9

METHOD AND APPARATUS FOR ACQUIRING CONFIGURATION INFORMATION

The present application is a National Stage of International Application No. PCT/CN2021/123333, filed on Oct. 12, 2021, which claims priority to Chinese Patent Application No. 202011139267.0, titled "METHOD AND APPARATUS FOR ACQUIRING CONFIGURATION INFORMATION", filed to China National Intellectual Property Administration on Oct. 22, 2020, the contents of the above two applications are hereby incorporated by reference in their entireties.

TECHNICAL FIELD

Embodiment of the present disclosure relates to the technical field of communication, and in particular to a method and an apparatus for acquiring configuration information.

BACKGROUND

In the direct communication technology of things or sidelink communication technology, a terminal device and a terminal device can communicate directly and transmit data, and this kind of link is called direct link.

In the direct link, when a sending-side terminal device needs to send data to a receiving-side terminal device, it needs to acquire network configuration information of the direct link between two terminal devices first to complete data transmission. At present, if a distance between the sending-side terminal device and the receiving-side terminal device is farther, one or more relay devices can be introduced between the sending-side terminal device and the receiving-side terminal device in order to improve the transmission coverage, and the relay devices can forward data, thereby expanding a sending range of the sending-side terminal device.

SUMMARY

Embodiments of the present disclosure provides a method and an apparatus for acquiring configuration information.

In a first aspect, an embodiment of the present disclosure provides a method for acquiring configuration information, including:

acquiring, by a relay device, first service information and/or first quality of service information of a first link from a first device, where the first link is a link between the first device and the relay device;

sending, by the relay device, the first service information and/or second quality of service information to a network device, where the second quality of service information is a subset of the first quality of service information; and acquiring, by the relay device, configuration information of a second link from the network device, where the second link is a link between the relay device and a second device.

In a second aspect, an embodiment of the present disclosure provides an apparatus for acquiring configuration information, including:

at least one processor and a memory;

where the memory stores computer execution instructions; and the at least one processor, when executing the computer execution instructions stored in the memory, is configured to:

acquire first service information and/or first quality of service information of a first link from a first device, where the first link is a link between the first device and a relay device;

send the first service information and/or second quality of service information to a network device, where the second quality of service information is a subset of the first quality of service information; and acquire configuration information of a second link from the network device, where the second link is a link between the relay device and a second device.

In a third aspect, an embodiment of the present disclosure provides an apparatus for acquiring configuration information, including:

at least one processor and a memory;

where the memory stores computer execution instructions; and the at least one processor, when executing the computer execution instructions stored in the memory, is configured to:

send service information to a network device, where the service information includes traffic pattern information; and receive configuration information of a first link from the network device, where the first link is a link between a first terminal device and a relay device.

In a fourth aspect, an embodiment of the present disclosure provides a computer-readable storage medium, stored computer execution instructions, and a processor, when executing the computer execution instructions, implements the method for acquiring configuration information according to the first aspect.

The method and apparatus for acquiring configuration information provided by the embodiment of the present disclosure, firstly, a relay device acquires first service information and/or first quality of service information of a first link from a first device, where the first link is a link between the first device and the relay device; then, the relay device sends the first service information and/or second quality of service information to a network device, where the second quality of service information is a subset of the first quality of service information; finally, the relay device acquires configuration information of a second link from the network device, where the second link is a link between the relay device and a second device.

BRIEF DESCRIPTION OF DRAWINGS

FIG. 9 is a flowchart diagram of a method for acquiring configuration information provided by an embodiment of the present disclosure.

DESCRIPTION OF EMBODIMENTS

Figure 1:
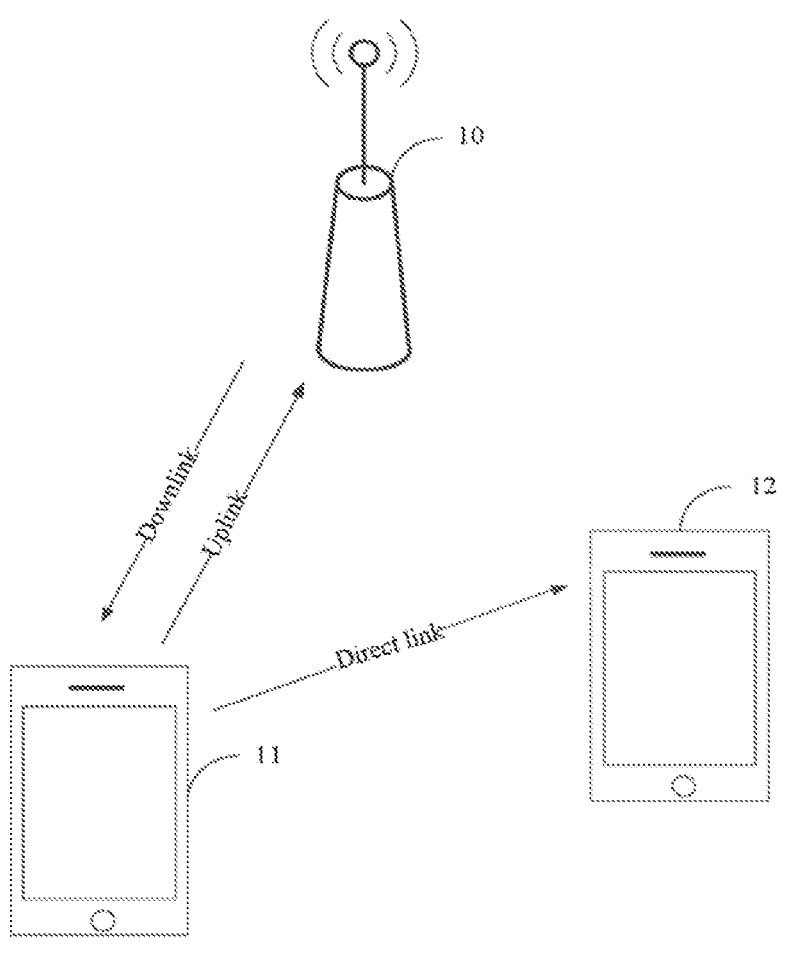
FIG. 1 is a schematic diagram of uplink, downlink and sidelink provided by an embodiment of the present disclosure.

In order to make the purpose, technical scheme and advantages of the embodiments of the present disclosure more clear, the technical scheme in the embodiments of the present disclosure will be described clearly and completely with reference to the accompanying drawings. Obviously, the described embodiment is a part of the embodiment of the present disclosure, but not all the embodiments. Based on the embodiments in present disclosure, all other embodiments acquired by those skilled in the art without creative work falls to the protection scope of the present disclosure.

In order to facilitate understanding, firstly, the concepts involved in the present disclosure are explained.

Terminal device: usually has wireless transceiver function, and the terminal device can be deployed on land, including indoor or outdoor, handheld, wearable or vehicle-mounted; it can also be deployed on the water (such as ships, etc.); it can also be deployed in the air (such as airplanes, balloons and satellites). The terminal device can be a mobile phone, a tablet computer (Pad), a computer with wireless transceiver function, a virtual reality (VR) terminal device, an augmented reality (AR) terminal device, wireless terminal device in industrial control, vehicle-mounted terminal device, wireless terminal device in self driving, wireless terminal device in remote medical, wireless terminal device in smart grid, wireless terminal device in transportation safety, wireless terminal device in smart city, wireless terminal device in smart home, wearable terminal device, etc. The terminal device involved in the embodiment of the present disclosure can also be referred to as a terminal, a user equipment (UE), an access terminal device, a vehicle-mounted terminal, an industrial control terminal, a UE unit, a UE station, a mobile station, a mobile table, a remote station, a remote terminal device, a mobile device, a UE terminal device, a wireless communication device, a UE agent or a UE apparatus, etc. The terminal device can also be fixed or mobile.

Network device: generally has wireless transceiver function, and the network device can be mobile. For example, the network device can be a mobile device. In an embodiment, the network device can be a satellite or a balloon station. For example, the satellite can be a low earth orbit (LEO) satellite, a medium earth orbit (MEO) satellite, a geostationary earth orbit (GEO) satellite, a high elliptical orbit (HEO) satellite, etc. Of course, the network device can also be a base station located on land, water and other places, for example, the network device can be a next generation NodeB (gNB) or a next generation-evolved NodeB (ng-eNB). Among them, gNB provides user plane function and control plane function of new radio (NR) for UE, and ng-eNB provides user plane function and control plane function of evolved universal terrestrial radio access (E-UTRA) for UE. It should be noted that gNB and ng-eNB are only names used to indicate base stations supporting 5G network systems, and they are not restrictive. The network device can also be a base transceiver station (BTS) in a global system for mobile communications (GSM) system or a code division multiple access (CDMA) system, a nodeB (NB) in a wideband code division multiple access (WCDMA) system, and an evolved node B (eNB or cNodeB) in a long term evolution (LTE) system. Alternatively, the network device can also be a relay station, an access point, a vehicle-mounted device, a wearable device, a network-side device in a network after 5G or a network device in a future evolved public land mobile network (PLMN) network, a roadside site unit (RSU), etc.

Quality of service information: Quality of service, referred to as QoS information for short, represents a series of service requests to be met by the network during data transmission. For example, it can be quantified as performance indicators such as bandwidth, delay, jitter, loss rate, throughput, etc. It is an agreement on information transmission quality. In the embodiments of the present disclosure, when the sending-side terminal device needs to transmit data to the receiving-side terminal device, there will exist total quality of service information, which indicates a service request that needs to be met by the sending-side terminal device when transmitting data to the receiving-side terminal device. As the relay device may be introduced between the sending-side terminal device and the receiving-side terminal device, and multiple links are involved, the quality of service information on each link can be acquired based on the total quality of service information.

Traffic pattern information: traffic pattern, which mainly includes period, offset and packet size of the service. Here, the service refers to a service that the sending-side terminal device transmits data to the receiving-side terminal device.

Configured grant configuration information: refers to the process that between two devices, when a device authorizes the other device once through activation, the other device will always use the resources specified by the previous authorization for transmission in case deactivation is not received. Common configured grant includes uplink configured grant, which is configured grant between the base station and the terminal device. In the embodiments of the present disclosure, data transmission between a terminal device and a relay device or between relay devices is involved, and the configured grant configuration information can be used for configured grant between the terminal device and the relay device, or between the relay devices.

Bearer configuration information: refers to the protocol stack configuration information used for data transmission between two devices. In wireless networks, data is transmitted through bearers, and different bearers have different protocol stack configurations. For example, the user plane protocol stack usually includes Service Data Adaptation Protocol (SDAP) layer, packet data convergence protocol (PDCP) layer, Radio Link control (RLC) layer and Media Access Control (MAC) layer, and the bearer configuration information will configure each layer respectively to meet data transmission requirements.

Relay device: is also known as relay, is a transmission path between two switching centers. In the present disclosure, in order to improve the transmission coverage, a relay device can be introduced between the sending terminal and the receiving terminal, and the relay device can forward received data to the receiving terminal, thereby expanding sending range of the sending terminal.

For example, in a cellular system, a relay device can be introduced between a base station and a terminal device, and the relay device is responsible for forwarding the data of the terminal device to the base station or forwarding the data of the base station to the terminal device.

Sidelink (SL) communication technology, also known as direct communication technology of things, is a communication technology that is different from that of an ordinary wireless cellular network. In a traditional cellular network, a terminal device communicates with a network device, and the link between the terminal device and the network device is called Uplink or Downlink, and an interface is called Uu interface. In the direct communication between things, terminal devices communicate directly with each other. The link between the terminal devices is called direct link, an interface is called PC5 interface, and the sidelink can also be called direct link.

FIG. 1 is a schematic diagram of uplink, downlink and sidelink provided by an embodiment of the present disclosure. As shown in FIG. 1, a base station 10, a terminal 11 and a terminal 12 is included, where there are uplink and downlink between the base station 10 and the terminal 11. The base station 10 can send downlink data to the terminal 11 through the downlink, and the terminal 11 can send uplink data to the base station 10 through the uplink.

There is a direct link between the terminal 11 and the terminal 12. Through the direct link, the terminal 11 can send data to the terminal 12, and the terminal 12 can also send data to the terminal 11.

At first, sidelink was introduced to realize the direct communication between terminal devices with relatively close distance, and the data does not need to be forwarded through the base station, thus reducing the transmission delay. Later, a sidelink relay is designed based on the introduction of sidelink. In the past, the relay used the technology of uplink and downlink communication between the relay and the terminal device, while the sidelink relay use the sidelink technology in the link between the relay device and the terminal device.

Figure 2:
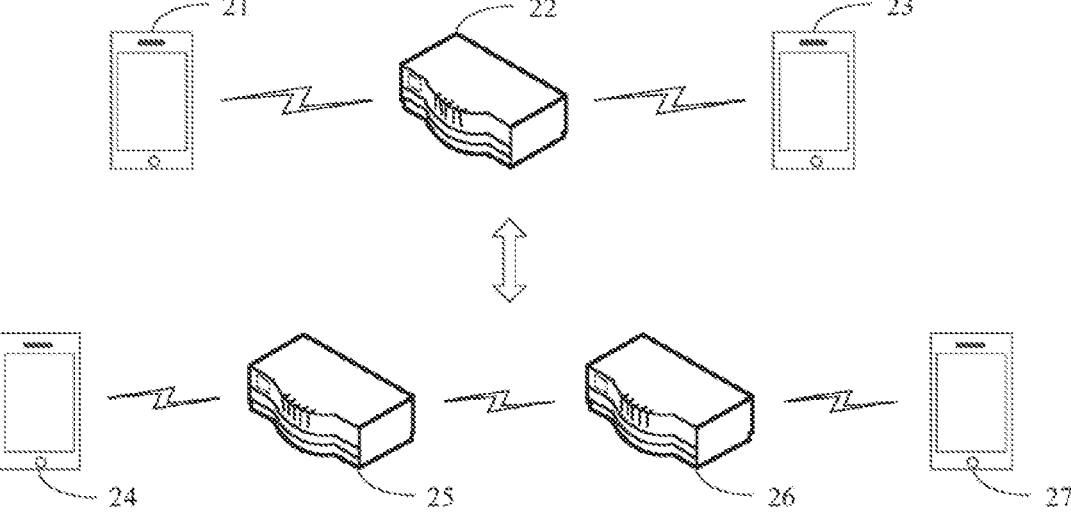
FIG. 2 is a schematic diagram of introducing a relay device between terminal devices provided by an embodiment of the present disclosure.

In order to extend the communication distance of the direct link, a relay device can be introduced between terminal devices. FIG. 2 is a schematic diagram of introducing a relay device between terminal devices provided by an embodiment of the present disclosure. As shown in FIG. 2, one or more relay devices can be introduced between two terminal devices.

At the top of FIG. 2, a relay device 22 is introduced between the terminal device 21 and the terminal device 23. At the bottom of FIG. 2, a plurality of relay devices are introduced between the terminal device 24 and the terminal device 27, and FIG. 2 illustrates the situation of two relay devices, including the relay device 25 and the relay device

26. In practice, the number of introduced relay devices can be three, four, etc., and the number is not limited.

Figure 3:
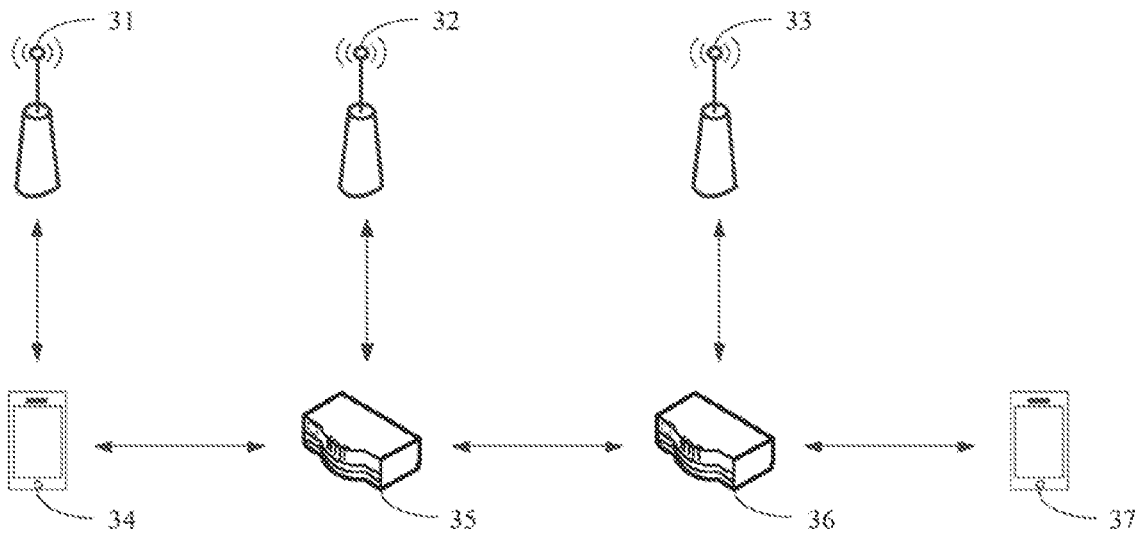
FIG. 3 is a schematic diagram of an application scenario provided by an embodiment of the present disclosure.

FIG. 3 is a schematic diagram of an application scenario provided by an embodiment of the present disclosure. As shown in FIG. 3, it includes a network device 31, a network device 32 and a network device 33, as well as a first terminal device 34, a second terminal device 37 and k relay devices, where k is a positive integer. FIG. 3 illustrates two relay devices, namely relay device 35 and relay device 36, respectively.

The network device 31 can communicate with the first terminal device 34, for example, the network device 31 can be a serving base station of the first terminal device 34. Similarly, the network device 32 can communicate with the relay device 35, for example, the network device 32 can be the serving base station of the relay device 35; the network device 33 can communicate with the relay device 36, for example, the network device 33 can be a serving base station of the relay device 36, and so on. It should be noted that the serving base station of each terminal device and the serving base station of each relay device may be different base stations from each other, or the same base station, which is not limited by the embodiment of the present disclosure.

The first terminal device 34 is a sending-side terminal device, and the second terminal device 37 is a receiving-side terminal device. In the embodiments of the present disclosure, the sending-side terminal device and the receiving-side terminal device are determined based on the actions performed by two terminal devices in one data transmission, and a terminal sending data is the sending-side terminal device and a terminal receiving data is the receiving-side terminal device. In some cases, if the second terminal device 37 needs to send data to the first terminal device 34, the second terminal device 37 is the sending-side terminal device and the first terminal device 34 is the receiving-side terminal device.

In the embodiments of the present disclosure, relay devices are set to expand the range of data transmission by terminal devices, and the number of relay devices between the first terminal device 34 and the second terminal device 37 is related to the distance between the first terminal device 34 and the second terminal device 37, signal quality and other factors.

When the first terminal device 34 determines that it needs to transmit data to the second terminal device 37, the first terminal device 34 needs to establish a link connection with the second terminal device 37 first. Specifically, the first terminal device 34 can send some control signaling outwardly. At this time, the relay device 35 receives the control signaling, and a link connection can be established between the first terminal device 34 and the relay device 35. The relay device 35 will continue to send control signaling outwardly, and after the control signaling is transmitted to the relay device 36, a link connection will be established between the relay device 35 and the relay device 36. Then the relay device 36 can send control signaling, and at this time, the second terminal device 37 receives the control signaling and establishes a link connection with the relay device 36. Therefore, a link connection is successfully established between the first terminal device 34 and the second terminal device 37 through the relay device 35 and the relay device 36.

After the link connection is established, the first terminal device 34 and the second terminal device 37 cannot transmit data directly, and it is necessary to acquire network configuration information of the link between the first terminal device 34 and the second terminal device 37.

When there is no relay device between the first terminal device 34 and the second terminal device 37, the first terminal device 34 is directly connected with the second terminal device 37 through a direct link. At this time, the serving base station of the first terminal device 34 can send the network configuration information of the direct link to the first terminal device 34, and the first terminal device 34 can send data to the second network device 37 based on the network configuration information of the direct link.

However, when there is a relay device between the first terminal device 34 and the second terminal device 37, the first terminal device 34 and the second terminal device 37 are connected through multiple links, and data transmission needs to be forwarded from the first terminal device 34 through the relay device before reaching the second terminal device 37.

In order to solve the data transmission problem when a relay device is introduced between a sending-side terminal device and a receiving-side terminal device, an embodiment of the present disclosure provides a scheme for acquiring network configuration information to solve the problem of how to acquire network configuration information of links between a terminal device and a relay device, and between relay devices when the relay device is introduced between the sending-side terminal device and the receiving-side terminal device.

Figure 4:
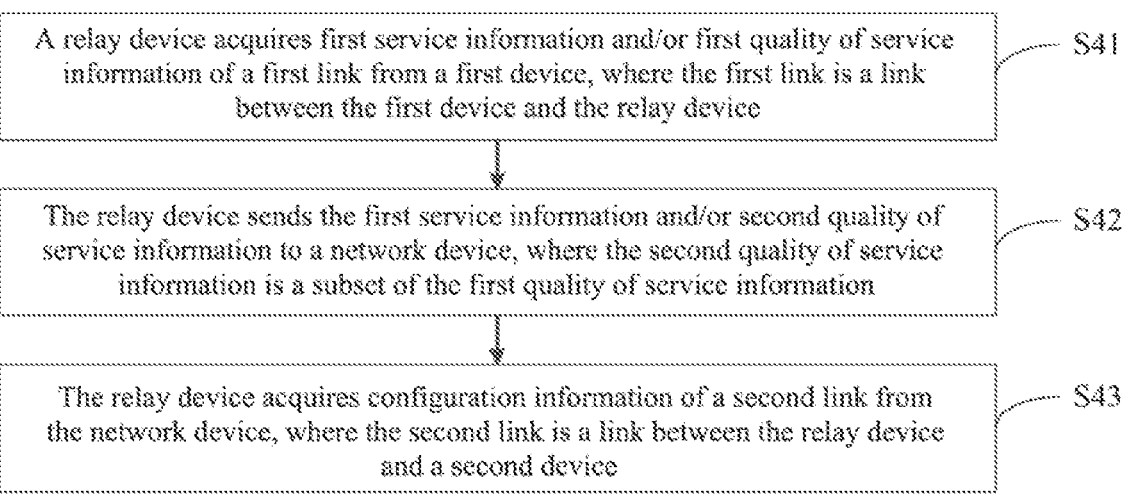
FIG. 4 is a flowchart diagram of a method for acquiring configuration information provided by an embodiment of the present disclosure.

FIG. 4 is a flowchart diagram of a method for acquiring configuration information provided by an embodiment of the present disclosure. As shown in FIG. 4, the method may include: in S41: a relay device acquires first service information and/or first quality of service information of a first link from a first device, where the first link is a link between the first device and the relay device.

The application scenario of the embodiment of the present disclosure is that a connection is established between a sending-side terminal device and a receiving-side terminal device through at least one relay device, and the execution body of the method is any relay device between the sending-side terminal device and the receiving-side terminal device.

The first device is a previous device node of the relay device, and the link established between the first device and the relay device is the first link. The first device may be the sending-side terminal device or another relay device. The first device can send the first service information and/or the first quality of service information of the first link to the relay device.

The first service information may include, for example, a traffic pattern, configured grant configuration information of the first link, identification information of the first link, and the like. The first quality of service information may be quality of service information of all links between the sending-side terminal device and the receiving-side terminal device, or quality of service information of all links after the first link, and so on.

In S42, the relay device sends the first service information and/or second quality of service information to a network device, where the second quality of service information is a subset of the first quality of service information.

After receiving the first service information and/or the first quality of service information of the first link from the first device, the relay device needs to send the first service information and/or the second quality of service information to the network device, where the network device here is a network device that has established a communication connection with the relay device, such as a serving base station for the relay device.

If the relay device receives the first service information from the first device, it can directly forward the first service information to the network device. If the relay device receives the first quality of service information from the first device, it can send the second quality of service information to the network device, where the second quality of service information is a subset of the first quality of service information.

As the network device needs to configure configuration information of a second link for the relay device based on the first service information and/or the second quality of service information, the second quality of service information must include quality of service information of the second link, and may selectively include quality of service information of other links. The second link is a link after the first link, therefore, the first quality of service information must include the quality of service information of the second link, and the second quality of service information is a subset of the first quality of service information.

In S43, the relay device acquires configuration information of a second link from the network device, where the second link is a link between the relay device and a second device.

After the network device acquires the first service information and/or the second quality of service information, it can also configure the second link based on the first service information and/or the second quality of service information, and send the configuration information of the second link to the relay device. The second link is a link between the relay device and the second device, where the second device can be the receiving-side terminal device or other relay devices. After acquiring the configuration information of the second link, the data can be transmitted from the relay device to the second device.

The method for acquiring configuration information provided by the embodiment of the present disclosure, firstly, a relay device acquires first service information and/or first quality of service information of a first link from a first device, where the first link is a link between the first device and the relay device; then, the relay device sends the first service information and/or second quality of service information to a network device, where the second quality of service information is a subset of the first quality of service information; finally, the relay device acquires configuration information of a second link from the network device, where the second link is a link between the relay device and a second device. Through the method of the embodiment of the present disclosure, the relay device is able to acquire the configuration information of the second link with the second device, and the second device is a next device node of the relay device. For any relay device between a sending-side terminal device and a receiving-side terminal device, the above scheme can be adopted to acquire configuration information of its next link, thus realizing acquisition of configuration information of all links between the sending-side terminal device and the receiving-side terminal device, and further realizing data transmission between the sending-side terminal device and the receiving-side terminal device.

Next, the scheme of the embodiments of the present disclosure will be introduced in detail with reference to the accompanying drawings.

The first device is a previous device node of the relay device, and the second device is a posterior device node of the relay device. According to the present disclosure scenario illustrated in FIG. 3, for any relay device, its corresponding first device may be the first terminal device, that is, the sending-side terminal device, or it may be another relay device, that is, a first relay device; and its corresponding second device may be the second terminal device, that is, the receiving-side terminal device, or other relay device, that is, a second relay device.

The contents included in the first service information or the first quality of service information may be different for different situations of the first device, and the contents included in the configuration information may be different for different situations of the second device. This will be explained in detail below.

Figure 5:
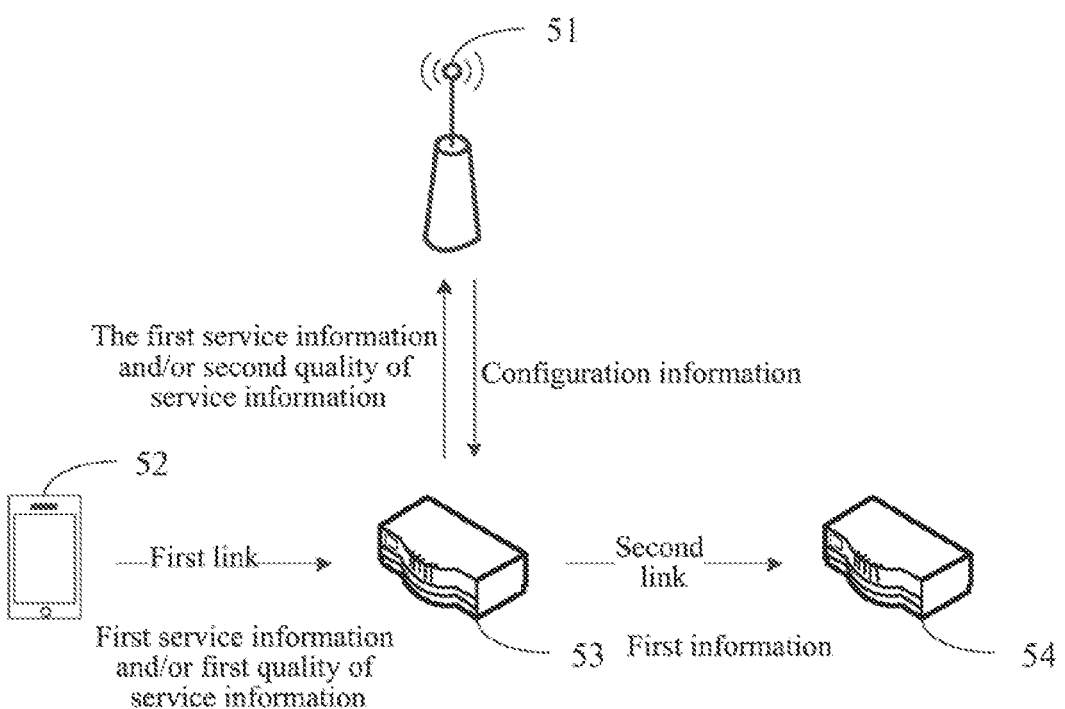
FIG. 5 is a schematic diagram 1 for acquiring configuration information provided by an embodiment of the present disclosure.

FIG. 5 is a schematic diagram 1 for acquiring configuration information provided by an embodiment of the present disclosure. As shown in FIG. 5, it includes a network device 51, a first terminal device 52, a relay device 53 and a second relay device 54. FIG. 5 illustrates a case where the first device is the first terminal device 52 and the second device is the second relay device 54. The link between the first terminal device 52 and the relay device 53 is a first link, and the link between the relay device 53 and the second relay device 54 is a second link.

In the scenario illustrated in FIG. 5, the first terminal device 52 sends first service information and/or first quality of service information to the relay device 53, where the first service information includes one or more of configured grant configuration information of the first link, traffic pattern information and identification information of the first link.

The relay device 53 sends the first service information and/or second quality of service information to the network device 51. If the first terminal device is connected with the second terminal device through M links, and the relay device is connected with the second terminal device through N links, and the N links are a subset of the M links, then the N links include the second link, both M and N are positive integers, and M is greater than or equal to N.

Then, the first quality of service information includes quality of service information of each of the M links, or includes quality of service information of each of the N links; the second quality of service information is the first quality of service information, or the second quality of service information is quality of service information of the second link.

After receiving the first service information and/or the second quality of service information, the network device 51 can determine the configuration information based on the first service information and/or the second quality of service information, and send the configuration information to the relay device 53, where the configuration information includes at least one of bearer configuration information of the second link and configured grant configuration information of the second link.

Then the relay device 53 can send first information to the second relay device 54. At this time, the first information includes third quality of service information and second service information of the second link.

The third quality of service information includes quality of service information of each of the M links, or includes quality of service information of each of the N links except the second link. The second service information includes one or more of configured grant configuration information of the second link, traffic pattern information and identification information of the second link.

Figure 6:
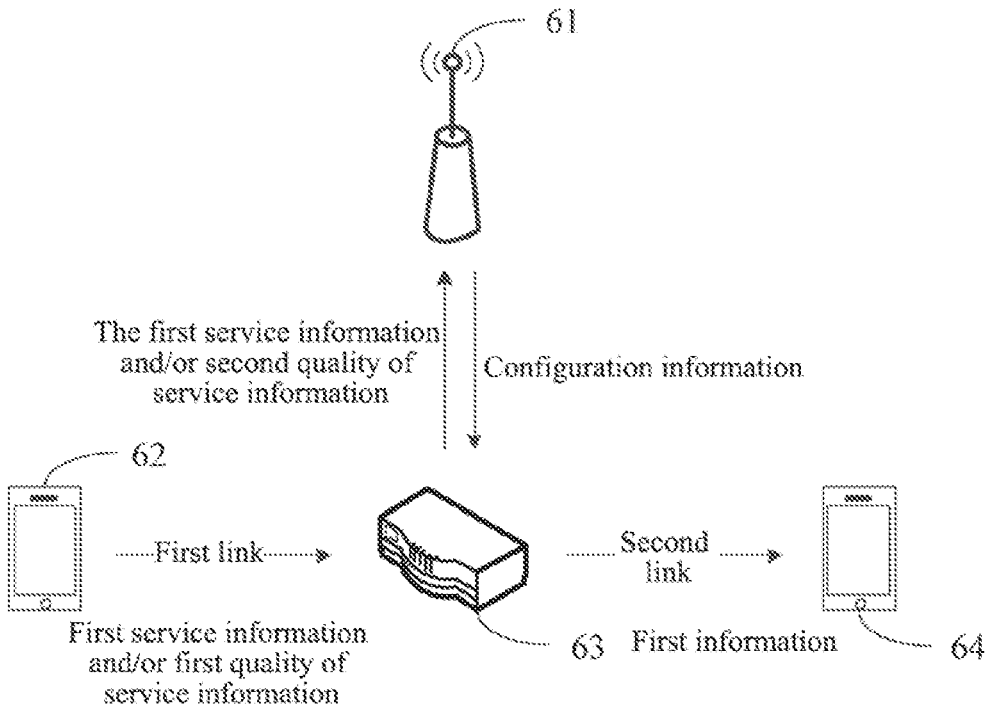
FIG. 6 is a schematic diagram 2 for acquiring configuration information provided by an embodiment of the present disclosure.

FIG. 6 is a schematic diagram 2 for acquiring configuration information provided by an embodiment of the present disclosure. As shown in FIG. 6, it includes a network device 61, a first terminal device 62, a relay device 63 and a second terminal device 64. FIG. 6 illustrates a case where the first device is a first terminal device 62 and the second device is a second terminal device 64. The link between the first terminal device 62 and the relay device 63 is the first link, and the link between the relay device 63 and the second terminal device 64 is the second link.

In the scenario illustrated in FIG. 6, the first terminal device 62 sends first service information and/or first service quality information to the relay device 63, and the relay device 63 sends the first service information and/or second service quality information to the network device 61.

After receiving the first service information and/or the second service quality information, the network device 61 can determine configuration information based on the first service information and/or the second service quality information, and send the configuration information to the relay device 63. The relay device 63 can then send first information to the second terminal device 64.

In the scenario illustrated in FIG. 6, the first service information, the first service quality information, the second service quality information, the configuration information and the third service quality information all correspond to the contents included in the first service information, the first service quality information, the second service quality information, the configuration information and the third service quality information in the scenario illustrated in FIG. 5 and are identical to the same. The difference is that in the scenario illustrated in FIG. 6, the first information only includes the third quality of service information, and does not include the second service information of the second link.

Figure 7:
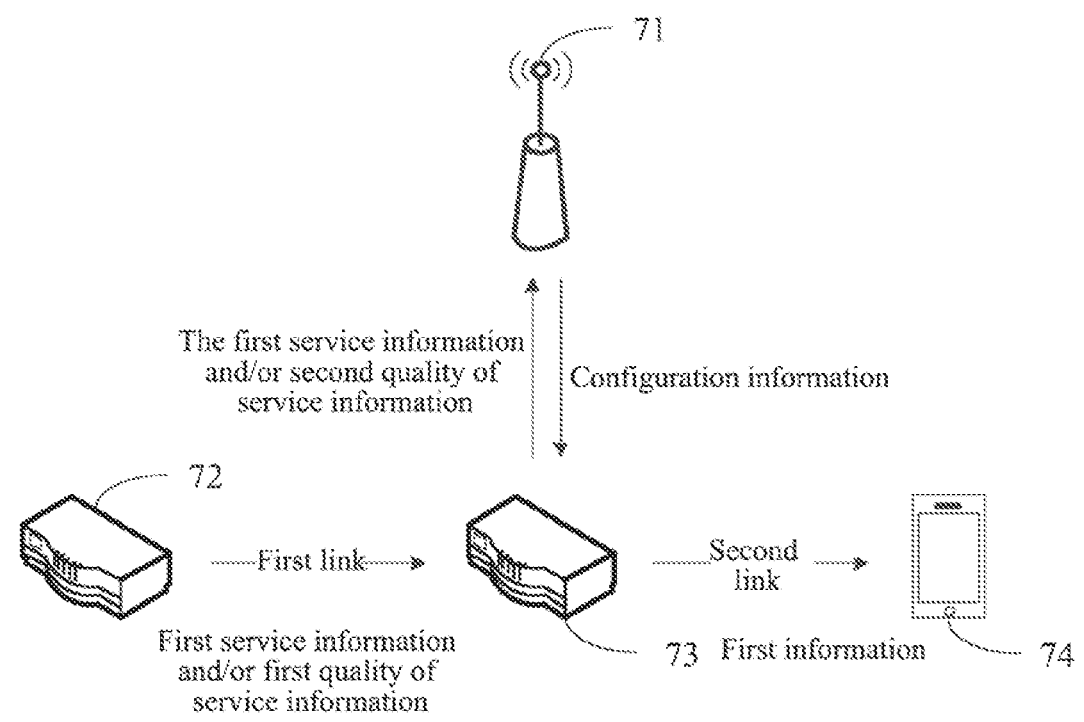
FIG. 7 is a schematic diagram 3 for acquiring configuration information provided by an embodiment of the present disclosure.

FIG. 7 is a schematic diagram 3 for acquiring configuration information provided by an embodiment of the present disclosure. As shown in FIG. 7, it includes a network device 71, a first relay device 72, a relay device 73 and a second terminal device 74. FIG. 7 illustrates a case where the first device is the first relay device 72 and the second device is the second terminal device 74. The link between the first relay device 72 and the relay device 73 is the first link, and the link between the relay device 73 and the second terminal device 74 is the second link.

In the scenario illustrated in FIG. 7, the first relay device 72 sends first service information and/or first quality of service information to the relay device 73, and the relay device 73 sends the first service information and/or second quality of service information to the network device 71.

After receiving the first service information and/or the second service quality information, the network device 71 can determine configuration information based on the first service information and/or the second service quality information, and send the configuration information to the relay device 73. The relay device 73 can then send first information to the second terminal device 74.

In the scenario illustrated in FIG. 7, the first service information, the first quality of service information, the second quality of service information, the configuration information and the first information all correspond to contents included in the first service information, the first quality of service information, the second quality of service information, the configuration information and the first information in the scenario illustrated in FIG. 6 and are identical to the same, and will not be repeated here.

Figure 8:
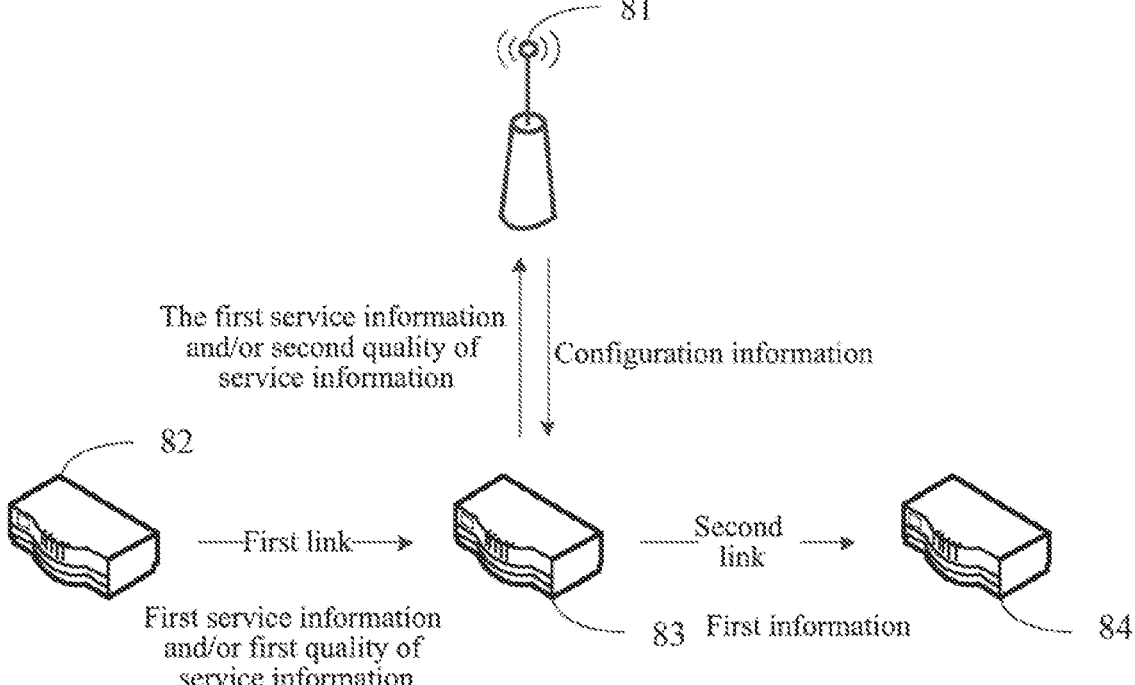
FIG. 8 is a schematic diagram 4 for acquiring configuration information provided by an embodiment of the present disclosure.

FIG. 8 is a schematic diagram 4 for acquiring configuration information provided by an embodiment of the present disclosure. As shown in FIG. 8, it includes a network device 81, a first relay device 82, a relay device 83 and a second relay device 84. FIG. 8 illustrates a case where the first device is the first relay device 82 and the second device is the second relay device 84. The link between the first relay device 82 and the relay device 83 is the first link, and the link between the relay device 83 and the second relay device 84 is the second link.

In the scenario illustrated in FIG. 8, the first relay device 82 sends first service information and/or first quality of service information to the relay device 83, and the relay device 83 sends the first service information and/or second quality of service information to the network device 81.

After receiving the first service information and/or the second service quality information, the network device 81 can determine configuration information based on the first service information and/or the second service quality information, and send the configuration information to the relay device 83. The relay device 83 can then send first information to the second relay device 84.

In the scenario illustrated in FIG. 8, the first service information, the first quality of service information, the second quality of service information, the configuration information and the first information all correspond to the contents included in first service information, the first quality of service information, the second quality of service information, the configuration information and the first information in the scenario illustrated in FIG. 5 and are identical to the same, and will not be repeated here.

FIG. 9 is a flow diagram of a method for acquiring configuration information provided by an embodiment of the present disclosure. As shown in FIG. 9, the method may include:

in S91, a first terminal device sends service information to a network device, where the service information includes traffic pattern information.

The execution body of the method in the embodiment of the present disclosure is the first terminal device, which is a sending-side terminal device, and the network device is a serving base station of the first terminal device. Initially, the first terminal device sends service information to the network device, and the network device receives the service information, which includes traffic pattern information.

In S92, the first terminal device receives configuration information of a first link from the network device, where the first link is a link between the first terminal device and a relay device.

The network device configures the first link based on the service information to obtain the configuration information of the first link, where the first link is a link between the first terminal device and the relay device.

In an embodiment, the configuration information includes at least one of bearer configuration information of the first link and configured grant configuration information of the first link.

In an embodiment, in the embodiment of the present disclosure, the splitting of the total quality of service information can be completed by the first terminal device or by the network device.

When the splitting of the total quality of service information is completed by the network equipment, the service information also includes a number of links M and total quality of service information, where the first terminal device is connected with the second terminal device through M links, and M−1 relay devices are included in the M links, M is an integer greater than 1. The configuration information also includes quality of service information of each of the M links.

When the splitting of the total quality of service information is completed by the first terminal device, the first terminal device first acquires total quality of service information and the number of links M, and then acquires the quality of service information of each of the M links based on the total quality of service information and the M.

In this case, the service information may include the quality of service information of each of the M links, and may also include the quality of service information of the first link. The configuration information also includes the quality of service information of each of the M links. In the following, the scheme of the present disclosure will be introduced with reference to two specific embodiments.

Figure 10:
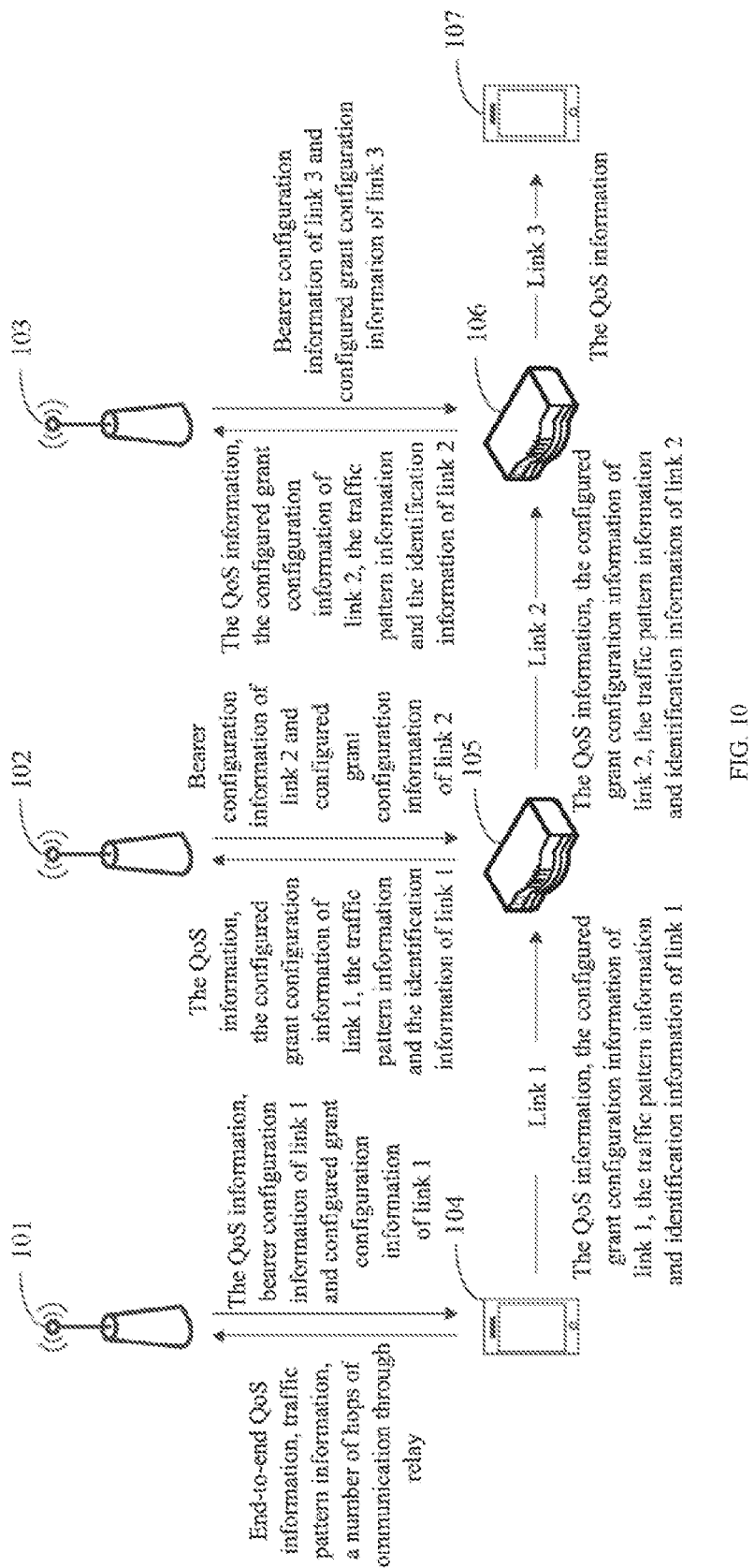
FIG. 10 is a schematic diagram 1 for acquiring configuration information provided by an embodiment of the present disclosure.

FIG. 10 is a schematic diagram 1 for acquiring configuration information provided by an embodiment of the present disclosure. As shown in FIG. 10, it includes a network device 101, a network device 102, a network device 103, a first terminal device 104, a relay device 105, a relay device 106 and a second terminal device 107.

The network device 101 can be a serving base station of the first terminal device 104, the network device 102 can be a serving base station of the relay device 105, and the network device 103 can be a serving base station of the relay device 106. The first terminal device 104 and the second terminal device 107 are connected through one or more relay devices, and two relay devices are exemplified in FIG. 10. The link between the first terminal device 104 and the relay device 105 is link 1, the link between the relay device 105 and the relay device 106 is link 2, and the link between the relay device 106 and the second terminal device 107 is link 3.

When acquiring configuration information of each link, each device performs the following steps:

Step 1: the first terminal device 104 sends end-to-end QoS information, traffic pattern information and a number of hops of communication through relay to the network device 101.

The number of hops of communication through relay is the number of the relay devices. For example, in FIG. 10, the number of hops of communication through relay is 2. The end-to-end QoS information is the total quality of service information in the above embodiment. After acquiring the total quality of service information and the number of hops of communication through relay, the network device 101 can allocate the QoS information of each link to the respective link. Therefore, in FIG. 10 illustrates that the total quality of service information is split by the network device 101.

Step 2: the network device 101 sends the QoS information, bearer configuration information of link 1 and configured grant configuration information of link 1 to the first terminal device 104.

In this step, the QoS information is QoS information on each link, where three links are included in FIG. 10, therefore, the QoS information here includes the QoS information of link 1, QoS information of link 2 and QoS information of link 3.

Step 3: the first terminal device 104 sends the QoS information, the configured grant configuration information of link 1, the traffic pattern information and identification information of link 1 to the relay device 105.

In this step, the QoS information may be the QoS information on each link or QoS information on other links except link 1. For example, in the example of FIG. 10, the QoS information may include the QoS information of link 2 and the QoS information of link 3. The identification information of link 1 is used to indicate which link is link 1.

Step 4: the relay device 105 sends the QoS information, the configured grant configuration information of link 1, the traffic pattern information and the identification information of link 1 to the network device 102.

In this step, the QoS information may be the QoS information of each link or only the QoS information of link 2.

Step 5: the network device 102 sends bearer configuration information and configured grant configuration information of link 2 to the relay device 105.

Step 6: the relay device 105 sends the QoS information, the configured grant configuration information of link 2, the traffic pattern information and identification information of link 2 to the relay device 106.

In this step, the QoS information may be the QoS information of each link or QoS information of other links except link 1 and link 2. For example, in the example of FIG. 10, the QoS information may be the QoS information of link 3. The identification information of link 2 is used to indicate which link is link 2.

Since only three links are illustrated in FIG. 10, if there are more links, among the links between relay devices, the operation of the relay devices is the same.

Step 7: the relay device 106 sends the QoS information, the traffic pattern information, the configured grant configuration information of link 2 and the identification information of link 2 to the network device 103.

Step 8: the network device 103 sends bearer configuration information of link 3 and configured grant configuration information of link 3 to the relay device 106.

Step 9: the relay device 106 sends the QoS information to the second terminal device 107.

In this step, the QoS information may be the QoS information of each link or only the QoS information of link 3.

Figure 11:
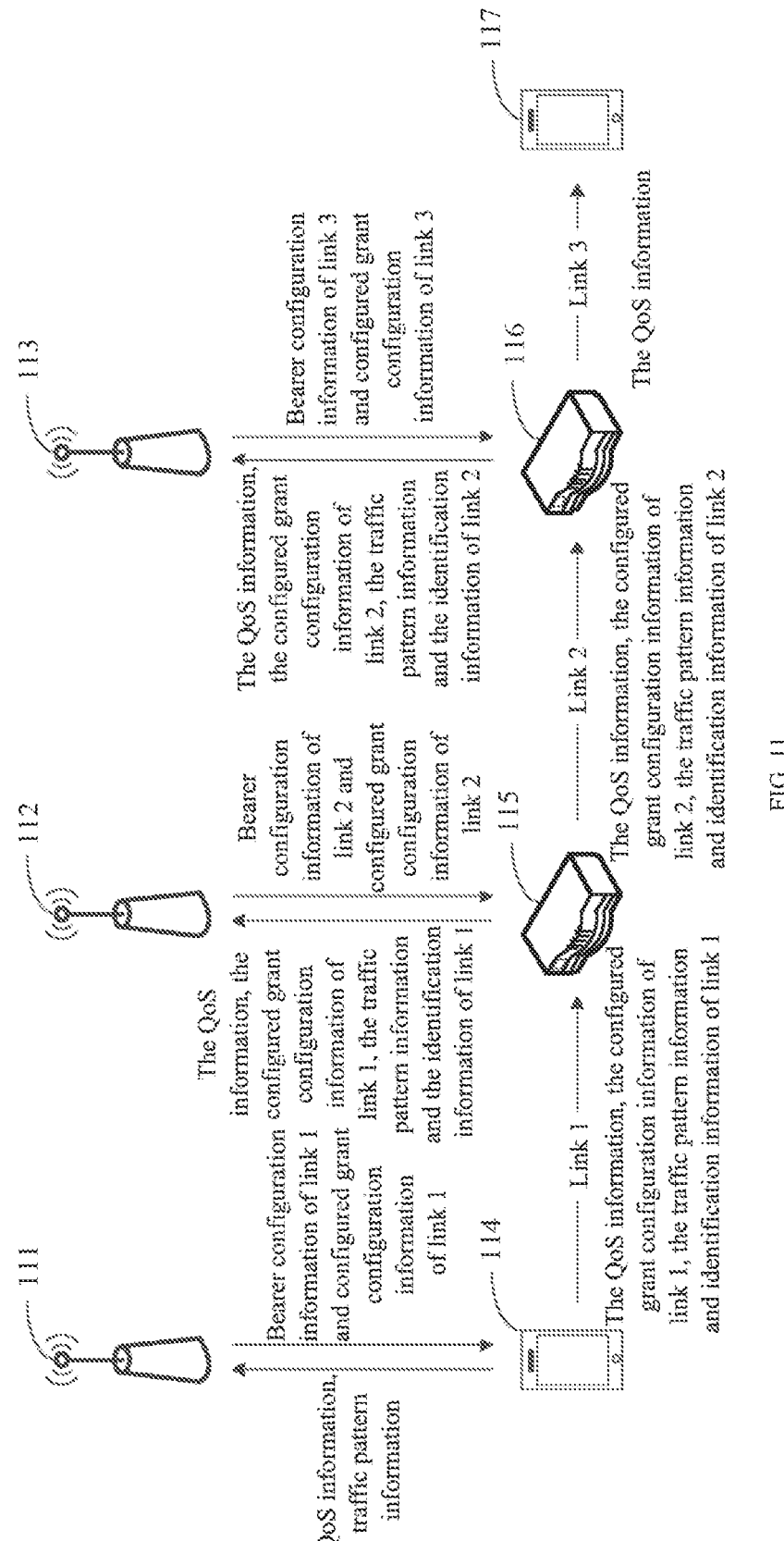
FIG. 11 is a schematic diagram 2 for acquiring configuration information provided by an embodiment of the present disclosure.

FIG. 11 is a schematic diagram 2 for acquiring configuration information provided by an embodiment of the present disclosure. As shown in FIG. 11, it includes a network device 111, a network device 112, a network device 113, a first terminal device 114, a relay device 115, a relay device 116 and a second terminal device 117.

The network device 111 can be a serving base station of the first terminal device 114, the network device 112 can be a serving base station of the relay device 115, and the network device 113 can be a serving base station of the relay device 116. The first terminal device 114 and the second terminal device 117 are connected by one or more relay devices, and two relay devices are illustrated in FIG. 11. The link between the first terminal device 114 and the relay device 115 is link 1, the link between the relay device 115 and the relay device 116 is link 2, and the link between the relay device 116 and the second terminal device 117 is link 3.

When acquiring configuration information of each link, each device performs the following steps:

Step 1: the first terminal device 114 sends QoS information and traffic pattern information to the network device 111.

In this step, the QoS information can be the QoS information of each link or just the QoS information of link 1. FIG. 11 illustrates that the total quality of service information is split by the first terminal device 114. After acquiring the total quality of service information and the number of hops of communication through relay, the first terminal device 114 can allocate the QoS information of each link to the respective link.

Step 2: the network device 111 sends bearer configuration information of link 1 and configured grant configuration information of link 1 to the first terminal device 114.

In this step, the QoS information is the QoS information of each link, which includes three links in FIG. 11, therefore, the QoS information here includes the QoS information of link 1, the QoS information of link 2 and the QoS information of link 3.

Step 3: the first terminal device 114 sends the QoS information, the configured grant configuration information of link 1, the traffic pattern information and identification information of link 1 to the relay device 115.

In this step, the QoS information may be the QoS information of each link or the QoS information of other links except link 1. For example, in the example of FIG. 11, the QoS information may include the QoS information of link 2 and the QoS information of link 3. The identification information of link 1 is used to indicate which link is link 1.

Step 4: the relay device 115 sends the QoS information, the configured grant configuration information of link 1, the traffic pattern information and the identification information of link 1 to the network device 112.

In this step, the QoS information may be the QoS information of each link or only the QoS information of link 2.

Step 5: the network device 112 sends bearer configuration information of link 2 and configured grant configuration information of link 2 to the relay device 115.

Step 6: the relay device 115 sends the QoS information, the configured grant configuration information of link 2, the traffic pattern information and identification information of link 2 to the relay device 116.

In this step, the QoS information may be the QoS information of each link or the QoS information of other links except link 1 and link 2. For example, in the example of FIG. 11, the QoS information may be the QoS information of link 3. The identification information of link 2 is used to indicate which link is link 2.

Since only three links are illustrated in FIG. 11, if there are more links, among the links between relay devices, the operation of the relay devices is the same.

Step 7: the relay device 116 sends the QoS information, the traffic pattern information, the configured grant configuration information of tlink 2 and the identification information of link 2 to the network device 113.

Step 8: the network device 113 sends bearer configuration information of link 3 and configured grant configuration information of link 3 to the relay device 116.

Step 9: the relay device 116 sends the QoS information to the second terminal device 117.

In this step, the QoS information may be the QoS information of each link or only the QoS information of link 3.

Figure 12:
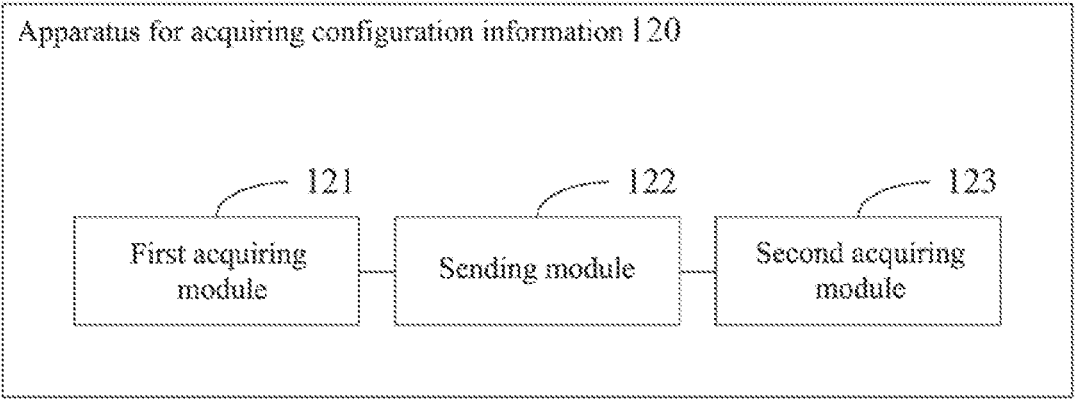
FIG. 12 is a schematic structural diagram of an apparatus for acquiring configuration information provided by an embodiment of the present disclosure.

FIG. 12 is a schematic structural diagram of an apparatus for acquiring configuration information provided by an embodiment of the present disclosure. As shown in FIG. 12, the apparatus for acquiring configuration information 120 includes:

a first acquiring module 121, configured to acquire first service information and/or first quality of service information of a first link from a first device, where the first link is a link between the first device and a relay device;

a sending module 122, configured to send the first service information and/or second quality of service information to a network device, where the second quality of service information is a subset of the first quality of service information; and a second acquiring module 123, configured to acquire configuration information of a second link from the network device, where the second link is a link between the relay device and a second device.

In a possible implementation, the first device is a first terminal device or a first relay device; and the second device is a second terminal device or a second relay device.

In a possible implementation, the first service information includes at least one of the following:

configured grant configuration information of the first link;

traffic pattern information; and identification information of the first link.

In a possible implementation, the configuration information includes at least one of the following:

bearer configuration information of the second link; and configured grant configuration information of the second link.

In a possible implementation, the first terminal device is connected with the second terminal device through M links, and the relay device is connected with the second terminal device through N links, where the N links are a subset of the M links, and the N links include the second link, both M and N are positive integers, and M is greater than or equal to N;

the first quality of service information includes quality of service information of each of the M links, or includes quality of service information of each of the N links; and the second quality of service information is the first quality of service information, or the second quality of service information is quality of service information of the second link.

In a possible implementation, the sending module 122 is further configured to:

send first information to the second device, where the first information includes third quality of service information.

In a possible implementation, the second device is the second relay device, and the first information further includes:

second service information of the second link.

In a possible implementation, the first terminal device is connected with the second terminal device through M links, and the relay device is connected with the second terminal device through N links, where the N links are a subset of the M links, and the N links include the second link, both M and N are positive integers, and M is greater than or equal to N; and the third quality of service information includes quality of service information of each of the M links, or includes quality of service information of each of the N links except the second link.

In one possible implementation, the second service information includes at least one of the following:

configured grant configuration information of the second link;

traffic pattern information; and identification information of the second link.

The apparatus provided by the embodiment of the present disclosure can be used to implement the technical scheme of the above method embodiment, and its implementation principle and technical effect are similar, and the details are not repeated here.

Figure 13:
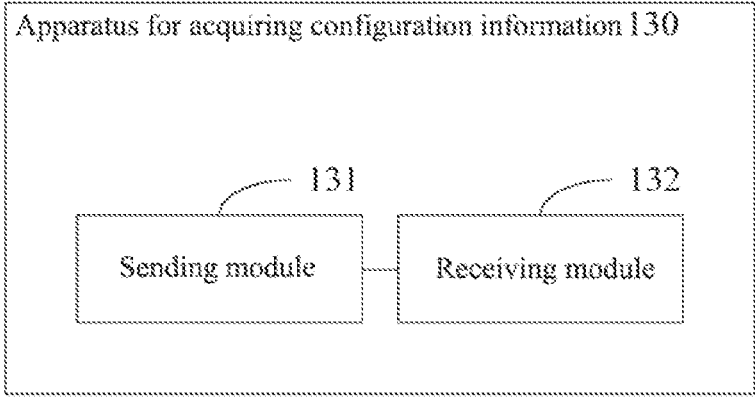
FIG. 13 is a schematic structural diagram of an apparatus for acquiring configuration information provided by an embodiment of the present disclosure.

FIG. 13 is a schematic structural diagram of an apparatus for acquiring configuration information provided by an embodiment of the present disclosure. As shown in FIG. 13, the apparatus for acquiring configuration information 130 includes:

a sending module 131, configured to send service information to a network device, where the service information includes traffic pattern information; and a receiving module 132, configured to receive configuration information of a first link from the network device, where the first link is a link between a first terminal device and a relay device.

In one possible implementation, the configuration information includes at least one of the following:

bearer configuration information of the first link; and configured grant configuration information of the first link.

In a possible implementation, the service information also includes a number of links M and total quality of service information, where the first terminal device is connected with the second terminal device through M links, and M−1 relay devices are included in the M links, M is an integer greater than 1.

In a possible implementation, the configuration information further includes:

quality of service information of each of the M links.

In a possible implementation, the first terminal device is connected with the second terminal device through M links, and the service information further includes at least one of the following:

quality of service information of each of the M links; and quality of service information of the first link.

In a possible implementation, the receiving module 132 is further configured to: acquire total quality of service information and the number of links M; and acquire the quality of service information of each of the M links based on the total quality of service information and the M.

The apparatus provided by the embodiment of the present disclosure can be used to implement the technical scheme of the above method embodiment, and its implementation principle and technical effect are similar, and the details are not repeated here.

Figure 14:
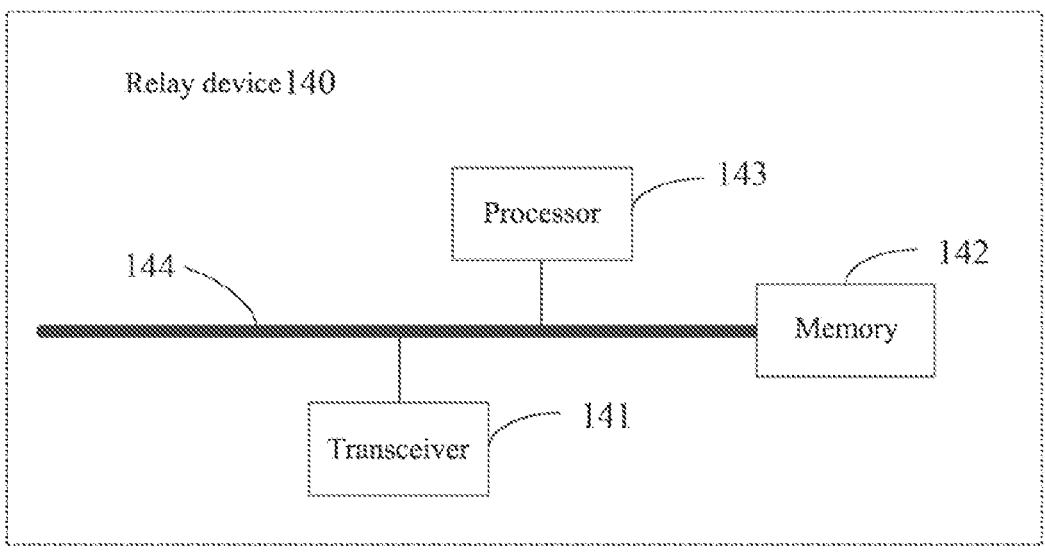
FIG. 14 is a schematic structural diagram of a relay device provided by an embodiment of the present disclosure.

FIG. 14 is a schematic structural diagram of a relay device provided by an embodiment of the present disclosure. Referring to FIG. 14, the relay device 140 may include a transceiver 141, a memory 142, and a processor 143. The transceiver 141 may include a transmitter and/or a receiver. The transmitter can also be called as a sender, a transmitting device, a sending port or a sending interface and the like, and the receiver can also be called as a receiver, a receiving device, a receiving port or a receiving interface and the like. Illustratively, the transceiver 141, the memory 142, and the processor 143 are interconnected by a bus 144.

The memory 142 is used to store program instructions; and the processor 143 is used to execute the program instructions stored in the memory to cause the relay device 140 to execute any of the methods for acquiring configuration information shown above.

The receiver of the transceiver 141 can be used to perform the receiving function of the relay device in the above method for acquiring configuration information.

Figure 15:
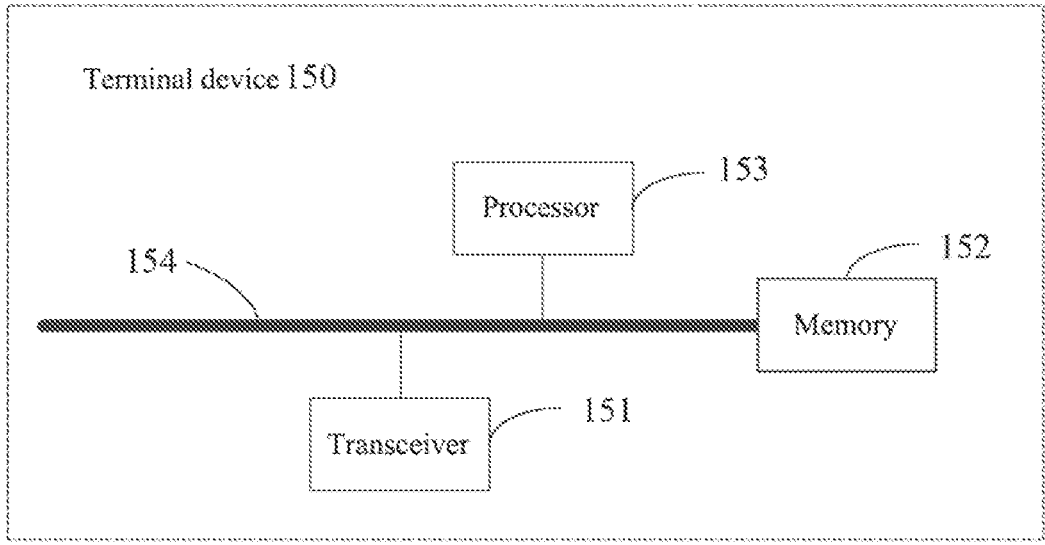
FIG. 15 is a schematic structural diagram of a terminal device provided by an embodiment of the present disclosure.

FIG. 15 is a schematic structural diagram of a terminal device provided by an embodiment of the present disclosure. Referring to FIG. 15, the terminal device 150 may include a transceiver 151, a memory 152, and a processor 153. The transceiver 151 may include a transmitter and/or a receiver. The transmitter can also be called as a sender, a transmitting device, a sending port or a sending interface and the like, and the receiver can also be called as a receiver, a receiving device, a receiving port or a receiving interface and the like. Illustratively, the transceiver 151, the memory 152, and the processor 153 are interconnected by a bus 154.

The memory 152 is used to store program instructions; and

The processor 153 is used to execute the program instructions stored in the memory to cause the terminal device 150 to execute any of the methods for acquiring configuration information shown above.

The receiver of the transceiver 151 can be used to perform the receiving function of the terminal device in the above methods for acquiring configuration information.

An embodiment of the present disclosure provides a computer-readable storage medium, the computer-readable storage medium stores computer execution instructions, and a processor, when executing the computer execution instructions, implements the above method for acquiring the configuration information.

An embodiment of the present disclosure also provide a computer program product which can be executed by a processor, and when the computer program product is executed, any one of the above method for acquiring configuration information executed by the terminal device is implemented.

The transmission device, the computer-readable storage medium and the computer program product of the embodiments of the present disclosure can execute the above method for acquiring configuration information executed by the network device, and the specific implementation process and beneficial effects thereof are described above, and are not described here.

In the several embodiments provided by present disclosure, it should be understood that the disclosed systems, apparatuses and methods can be realized in other ways. For example, the apparatuses embodiment described above is only exemplary. For example, the division of the units is only a logical function division. In actual implementation, there may be other division methods, such as multiple units or components can be combined or integrated into another system, or some features can be ignored or not implemented. On the other hand, the mutual coupling or direct coupling or communication connection shown or discussed can be indirect coupling or communication connection through some interfaces, apparatuses or units, which can be electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of the embodiments.

In addition, each functional unit in each embodiment of the present disclosure can be integrated into one processing unit, or each unit can exist physically alone, or two or more units can be integrated into one unit. The above integrated units can be realized in the form of hardware or software functional units.

It can be understood by those skilled in the art that all or part of the steps for implementing the above method embodiments can be completed by hardware related to program instructions. The aforementioned computer program can be stored in a computer-readable storage medium. The computer program, when executed by a processor, implements the steps including the above method embodiments; the aforementioned storage media include ROM, RAM, magnetic disk or optical disk and other media that can store program codes.

Embodiments of the present disclosure provides a method and an apparatus for acquiring configuration information, so as to solve the problem of how to acquire network configuration information of links between a terminal device and a relay device, and between relay devices when the relay device is introduced between a sending-side terminal device and a receiving-side terminal device.

In a first aspect, an embodiment of the present disclosure provides a method for acquiring configuration information, including:

acquiring, by a relay device, first service information and/or first quality of service information of a first link from a first device, where the first link is a link between the first device and the relay device;

sending, by the relay device, the first service information and/or second quality of service information to a network device, where the second quality of service information is a subset of the first quality of service information; and acquiring, by the relay device, configuration information of a second link from the network device, where the second link is a link between the relay device and a second device.

In a possible implementation, the first device is a first terminal device or a first relay device; and the second device is a second terminal device or a second relay device.

In a possible implementation, the first service information includes at least one of the following:

configured grant configuration information of the first link;

traffic pattern information; and identification information of the first link.

In a possible implementation, the configuration information includes at least one of the following:

bearer configuration information of the second link; and configured grant configuration information of the second link.

In a possible implementation, the first terminal device is connected with the second terminal device through M links, and the relay device is connected with the second terminal device through N links, where the N links are a subset of the M links, and the N links include the second link, both M and N are positive integers, and M is greater than or equal to N;

the first quality of service information includes quality of service information of each of the M links, or includes quality of service information of each of the N links; and the second quality of service information is the first quality of service information, or the second quality of service information is quality of service information of the second link.

In a possible implementation, the method further includes:

sending, by the relay device, first information to the second device, where the first information includes third quality of service information.

In a possible implementation, the second device is the second relay device, and the first information further includes:

second service information of the second link.

In a possible embodiment, the first terminal device is connected with the second terminal device through M links, and the relay device is connected with the second terminal device through N links, where the N links are a subset of the M links, and the N links include the second link, both M and N are positive integers, and M is greater than or equal to N;

the third quality of service information includes quality of service information of each of the M links, or includes quality of service information of each of the N links except the second link.

In a possible implementation, the second service information includes at least one of the following:

configured grant configuration information of the second link;

traffic pattern information; and identification information of the second link.

In a second aspect, an embodiment of the present disclosure provides a method for acquiring configuration information, including:

sending, by a first terminal device, service information to a network device, where the service information includes traffic pattern information; and receiving, by the first terminal device, configuration information of a first link from the network device, where the first link is a link between the first terminal device and a relay device.

In a possible implementation, the configuration information includes at least one of the following:

bearer configuration information of the first link; and configured grant configuration information of the first link.

In a possible implementation, the service information also includes a number of links M and total quality of service information, where the first terminal device is connected with the second terminal device through M links, and M−1 relay devices are included in the M links, M is an integer greater than 1.

In a possible implementation, the configuration information further includes:

quality of service information of each of the M links.

In a possible implementation, the first terminal device is connected with the second terminal device through M links, and the service information further includes at least one of the following:

quality of service information of each of the M links; and quality of service information of the first link.

In a possible implementation, the method further includes:

acquiring, by the first terminal device, total quality of service information and the number of links M; and acquiring, by the first terminal device, the quality of service information of each of the M links based on the total quality of service information and the M.

In a third aspect, an embodiment of the present disclosure provides an apparatus for acquiring configuration information, including:

a first acquisition module, configured to acquire first service information and/or first quality of service information of a first link from a first device, where the first link is a link between the first device and a relay device;

a sending module, configured to send the first service information and/or second quality of service information to a network device, where the second quality of service information is a subset of the first quality of service information; and a second acquisition module, configured to acquire configuration information of a second link from the network device, where the second link is a link between the relay device and a second device.

In a possible implementation, the first device is a first terminal device or a first relay device; and the second device is a second terminal device or a second relay device.

In a possible implementation, the first service information includes at least one of the following:

configured grant configuration information of the first link;

traffic pattern information; and identification information of the first link.

In a possible implementation, the configuration information includes at least one of the following:

bearer configuration information of the second link; and configured grant configuration information of the second link.

In a possible implementation, the first terminal device is connected with the second terminal device through M links, and the relay device is connected with the second terminal device through N links, where the N links are a subset of the M links, and the N links include the second link, both M and N are positive integers, and M is greater than or equal to N;

the first quality of service information includes quality of service information of each of the M links, or includes quality of service information of each of the N links; and the second quality of service information is the first quality of service information, or the second quality of service information is quality of service information of the second link.

In a possible implementation, the sending module is further configured to:

send first information to the second device, where the first information includes third quality of service information.

In a possible implementation, the second device is the second relay device, and the first information further includes:

second service information of the second link.

In a possible implementation, the first terminal device is connected with the second terminal device through M links, and the relay device is connected with the second terminal device through N links, where the N links are a subset of the M links, and the N links include the second link, both M and N are positive integers, and M is greater than or equal to N;

the third quality of service information includes quality of service information of each of the M links, or includes quality of service information of each of the N links except the second link.

In a possible implementation, the second service information includes at least one of the following:

configured grant configuration information of the second link;

traffic pattern information; and identification information of the second link.

In a fourth aspect, an embodiment of the present disclosure provides an apparatus for acquiring configuration information, including:

a sending module, configured to send service information to a network device, where the service information includes traffic pattern information; and a receiving module, configured to receive configuration information of a first link from the network device, where the first link is a link between a first terminal device and a relay device.

In a possible implementation, the configuration information includes at least one of the following:

bearer configuration information of the first link; and configured grant configuration information of the first link.

In a possible implementation, the service information also includes a number of links M and total quality of service information, where the first terminal device is connected with the second terminal device through M links, and M−1 relay devices are included in the M links, M is an integer greater than 1.

In a possible implementation, the configuration information further includes:

quality of service information of each of the M links.

In a possible implementation, the first terminal device is connected with the second terminal device through M links, and the service information further includes at least one of the following:

quality of service information of each of the M links; and quality of service information of the first link.

In a possible implementation, the receiving module is further configured to:

acquire total quality of service information and the number of links M; and acquire the quality of service information of each of the M links based on the total quality of service information and the M.

In a fifth aspect, an embodiment of the present disclosure provides a relay device, including at least one processor and a memory;

the memory stores computer execution instructions; and the at least one processor executes the computer execution instructions stored in the memory to cause the at least one processor to execute the method for acquiring configuration information according to any one of the first aspects.

In a sixth aspect, an embodiment of the present disclosure provides a terminal device, including at least one processor and a memory;

the memory stores computer execution instructions; and the at least one processor executes the computer execution instructions stored in the memory to cause the at least one processor to execute the method for acquiring the configuration information according to any one of the second aspect.

In a seventh aspect, an embodiment of the present disclosure provides a computer-readable storage medium, stored computer execution instructions, and a processor, when executing the computer execution instructions, implements the method for acquiring configuration information according to any one of the first aspect or the second aspect.

The method and apparatus for acquiring configuration information provided by the embodiment of the present disclosure, firstly, a relay device acquires first service information and/or first quality of service information of a first link from a first device, where the first link is a link between the first device and the relay device; then, the relay device sends the first service information and/or second quality of service information to a network device, where the second quality of service information is a subset of the first quality of service information; finally, the relay device acquires configuration information of a second link from the network device, where the second link is a link between the relay device and a second device. Through the method of the embodiment of the present disclosure, the relay device is able to acquire the configuration information of the second link with the second device, and the second device is a next device node of the relay device. For any relay device between a sending-side terminal device and a receiving-side terminal device, the above scheme can be adopted to acquire configuration information of its next link, thus realizing acquisition of configuration information of all links between the sending-side terminal device and the receiving-side terminal device, and further realizing data transmission between the sending-side terminal device and the receiving-side terminal device.

Finally, it should be explained that the above embodiments are only used to illustrate the technical scheme of the present disclosure, but not to limit it; although the present disclosure has been described in detail with reference to the foregoing embodiments, it should be understood by those skilled in the art that the technical scheme described in the foregoing embodiments can still be modified, or some or all of its technical features can be replaced by equivalents; However, these modifications or substitutions do not make the essence of the corresponding technical solutions deviate from the scope of the technical solutions of various embodiments of the present disclosure.

What is claimed is:

1. A method for acquiring configuration information, comprising:

acquiring, by a relay device, first quality of service information from a first device, wherein there is a first link between the first device and the relay device, and the first quality of service information is quality of service information of all links between the first device and a second device;

sending, by the relay device, second quality of service information to a network device, wherein the second quality of service information is a subset of the first quality of service information, and the second quality of service information is quality of service information of a second link; and acquiring, by the relay device, configuration information of the second link from the network device, wherein the second link is a link between the relay device and the second device, and the configuration information of the second link is determined based on the second quality of service information;

wherein the first device is a first terminal device or a first relay device; and the second device is a second terminal device or a second relay device.

2. The method according to claim 1, wherein the configuration information comprises at least one of the following: bearer configuration information of the second link; and configured grant configuration information of the second link.

3. The method according to claim 1, wherein the method further comprises:

sending, by the relay device, first information to the second device, wherein the first information comprises third quality of service information.

4. The method according to claim 3, wherein, the second device is the second relay device, and the first information further comprises:

second service information of the second link.

5. The method according to claim 4, wherein a sending-side device is connected with a receiving-side device through M links, and the relay device is connected with the second terminal device through N links, wherein the N links are a subset of the M links, and the N links comprise the second link, both M and N are positive integers, and M is greater than or equal to N:

the third quality of service information comprises quality of service information of each of the M links, or comprises quality of service information of each of the N links except the second link.

6. The method according to claim 4, wherein the second service information comprises at least one of the following:

configured grant configuration information of the second link;

traffic pattern information; and identification information of the second link.

7. An apparatus for acquiring configuration information, comprising:

at least one processor and a memory;

wherein the memory stores computer execution instructions; and the at least one processor, when executing the computer execution instructions stored in the memory, is configured to:

acquire first quality of service information from a first device, wherein there is a first link between the first device and a relay device, and the first quality of service information is quality of service information of all links between the first device and a second device;

send second quality of service information to a network device, wherein the second quality of service information is a subset of the first quality of service information, and the second quality of service information is quality of service information of a second link; and acquire configuration information of the second link from the network device, wherein the second link is a link between the relay device and the second device, and the configuration information of the second link is determined based on the second quality of service information;

wherein the first device is a first terminal device or a first relay device; and the second device is a second terminal device or a second relay device.

8. The apparatus according to claim 7, wherein the configuration information comprises at least one of the following:

bearer configuration information of the second link; and configured grant configuration information of the second link.

9. The apparatus according to claim 7, wherein the at least one processor is further configured to:

send first information to the second device, wherein the first information comprises third quality of service information.

10. The apparatus according to claim 9, wherein the second device is the second relay device, and the first information further comprises:

second service information of the second link.

11. The apparatus according to claim 10, wherein a sending-side device is connected with a receiving-side device through M links, and the relay device is connected with the second terminal device through N links, wherein the N links are a subset of the M links, and the N links comprise the second link, both M and N are positive integers, and M is greater than or equal to N;

the third quality of service information comprises quality of service information of each of the M links, or comprises quality of service information of each of the N links except the second link.

12. The apparatus according to claim 10, wherein the second service information comprises at least one of the following:

configured grant configuration information of the second link;

traffic pattern information; and identification information of the second link.

13. A non-transitory computer-readable storage medium, stored computer execution instructions, and a processor, when executing the computer execution instructions, is configured to:

acquire first quality of service information from a first device, wherein there is a first link between the first device and a relay device, and the first quality of service information is quality of service information of all links between the first device and a second device;

send second quality of service information to a network device, wherein the second quality of service information is a subset of the first quality of service information, and the second quality of service information is quality of service information of a second link; and acquire configuration information of the second link from the network device, wherein the second link is a link between the relay device and the second device, and the configuration information of the second link is determined based on the second quality of service information;

wherein the first device is a first terminal device or a first relay device; and the second device is a second terminal device or a second relay device.

* * * * *